(12) United States Patent
Frazier et al.

(10) Patent No.: US 10,467,135 B2
(45) Date of Patent: Nov. 5, 2019

(54) MULTI-SECTION GARBAGE COLLECTION

(71) Applicant: International Business Machines Corporation, Armonk, NY (US)

(72) Inventors: Giles R. Frazier, Austin, TX (US); Michael Karl Gschwind, Chappaqua, NY (US); Younes Manton, Toronto (CA); Karl M. Taylor, Kanata (CA); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/857,858

(22) Filed: Dec. 29, 2017

(65) Prior Publication Data

US 2018/0121349 A1 May 3, 2018

Related U.S. Application Data

(63) Continuation of application No. 15/683,933, filed on Aug. 23, 2017, which is a continuation of application No. 15/600,863, filed on May 22, 2017, now Pat. No. 9,916,239, which is a continuation of application No. 14/833,452, filed on Aug. 24, 2015, now Pat. No. 9,697,117, which is a continuation of application No. 14/755,643, filed on Jun. 30, 2015, now Pat. No. 9,734,052.

(51) Int. Cl.
*G06F 12/02* (2006.01)
(52) U.S. Cl.
CPC .. *G06F 12/0253* (2013.01); *G06F 2212/1044* (2013.01)

(58) Field of Classification Search
CPC ..... G06F 2009/45583; G06F 2212/657; G06F 3/0659; G06F 12/0253
See application file for complete search history.

(56) References Cited

U.S. PATENT DOCUMENTS

| 5,920,876 A | 7/1999 | Ungar et al. |
| 6,098,089 A | 8/2000 | O'Connor et al. |

(Continued)

OTHER PUBLICATIONS

"Power ISA™ Version 2.07B", International Business Machines Corporation, Apr. 9, 2015, pp. 1-1526.

(Continued)

*Primary Examiner* — Reginald G Bragdon
*Assistant Examiner* — Thanh D Vo
(74) *Attorney, Agent, or Firm* — Lieberman & Brandsdorfer, LLC

(57) ABSTRACT

The embodiments relate to a computer system, computer program product and method for managing a garbage collection process. Processing control is obtained based on execution of a load instruction and a determination that an object pointer to be loaded indicates a location within a selected portion of memory undergoing a garbage collection process. The determination includes identifying a base address and size of a first memory block subject to the garbage collection, and assigning a binary value to each first memory block section. An image of the load instruction is obtained and a pointer address is calculated from the image. It is determined whether the object pointer is to be modified. The object pointer is modified and stored in a selected location.

17 Claims, 9 Drawing Sheets

(56) References Cited

U.S. PATENT DOCUMENTS

| | | | |
|---|---|---|---|
| 6,308,185 B1 | 10/2001 | Grarup et al. | |
| 6,317,872 B1 | 11/2001 | Gee et al. | |
| 6,338,137 B1 * | 1/2002 | Shiell | G06F 9/30043 710/58 |
| 6,338,173 B1 * | 1/2002 | Ramsey | A47G 9/086 5/413 R |
| 7,287,049 B1 | 10/2007 | Printezis et al. | |
| 8,327,109 B2 | 12/2012 | Caspole | |
| 8,473,722 B2 | 6/2013 | Meyer | |
| 8,601,036 B2 | 12/2013 | Nalla et al. | |
| 2004/0148603 A1 * | 7/2004 | Baylis | G06F 9/45504 718/100 |
| 2005/0138092 A1 | 6/2005 | Abuaiadh et al. | |
| 2006/0259744 A1 | 11/2006 | Matthes | |
| 2010/0228796 A1 | 9/2010 | Goetz et al. | |

OTHER PUBLICATIONS

"Z/Architecture Principles of Operation", IBM® Publication No. SA22-7832-10, Eleventh Edition, Mar. 2015, pp. 1-1732.

IBM, "Declarative 'Meta-Stack' Garbage Collection in the C Programming Language," IP.com No. 000015532, Jun. 2003, pp. 1-4.

Software Patent Institute, et al., "Performance Evaluation of High-Level Language Systems," IP.com No. 000148142, Nov. 1977, pp. 1-45.

IBM, "Heuristic Garbage Collection," IP.com No. 000013453, Jun. 2003, pp. 1-3.

Software Patent Institute et al., "Compiling Parallel Programs by Optimizing Performance," IP.com No. 000161304, Jun. 1988, pp. 1-36.

Veldema, Ronald et al., "Object Combining: A New Aggressive Optimization for Object Intensive Programs," JGI '02 Proceedings of the 2002 joint ACM-ISCOPE conference on Java Grande, Nov. 2002, pp. 1-10.

Delozier, Low Pause-Time Garbage Collection, University of Pennsylvania, Written Preliminary Examination II, 2013, pp. 1-19.

Joao et al., Flexible Reference-Counting-Based Hardware Acceleration for Garbage Collection, ISCA'09, Jun. 20-24, 2009, Austin, Texas, USA, pp. 1-11.

List of IBM Patents or Applications Treated as Related, Dec. 2017.

* cited by examiner

MULTI-SECTION GARBAGE COLLECTION

CROSS REFERENCE TO RELATED APPLICATION(S)

This application is a continuation patent application claiming the benefit of the filing date of U.S. patent application Ser. No. 15/683,933 filed on Aug. 23, 2017 and titled "Multi-Section Garbage Collection", and Ser. No. 15/600,863 filed on May 22, 2017 and titled "Multi-Section Garbage Collection", now pending, U.S. patent application Ser. No. 14/833,452 filed on Aug. 24, 2015 and titled "Multi-Section Garbage Collection", now U.S. Pat. No. 9,697,117, and Ser. No. 14/755,643 filed on Jun. 30, 2015 and titled "Multi-Section Garbage Collection", now U.S. Pat. No. 9,743,052, all of which are hereby incorporated by reference.

BACKGROUND

The embodiments described herein relate to executing a garbage collection process on a memory block. More specifically, the embodiments relate to executing the garbage collection process while minimizing performance impact.

Garbage collection is an automatic memory management process that identifies objects in memory that are no longer being referenced and frees those objects. As memory objects of varying sizes are allocated and later freed, the memory in which they are stored becomes increasingly fragmented. Eventually, very few large free areas of memory exist, and it becomes difficult to store additional objects without increasing the memory size. When this occurs, a process within garbage collection, referred to as compaction, is employed in order to consolidate the allocated objects into one large area, leaving another large area of free space available for new objects. During consolidation, the memory objects that are still being referenced are moved from one area of memory to another area of memory.

Conventionally, when garbage collection is performed on an object storage area, applications using the object storage area are required to pause execution. One reason for this is to determine whether the pointers to the objects used by the applications to access the objects are still valid, since the objects may have moved. These pauses, occasionally several seconds long, prevent the applications from being used for time-sensitive tasks, such as transaction processing, real-time games, or mechanical control. Thus, a need exists for an optimized garbage collection process.

SUMMARY

The aspects described herein include a system, computer program product, and method for managing a garbage collection process executed on a block of user address space.

According to one aspect, a computer system is provided with tools, such as a processor and memory, to facilitate garbage collection within a computing environment. A processor is provided in communication with memory. The processor obtains processing control based on execution of a load instruction and a determination that an object pointer to be loaded indicates a location within a selected portion of memory undergoing a garbage collection process. Based on the determination, the processor identifies a base address and size of a first memory block subject to the garbage collection, and assigns a binary value to each first memory block section. The system further includes obtaining an image of the load instruction and calculating a pointer address from the image, determining whether the object pointer is to be modified, modifying the object pointer to provide a modified object pointer, and storing the modified object pointer in a selected location.

In another aspect, a computer program product is provided to facilitate garbage collection within a computing environment. The computer program product includes computer readable storage medium readable by a processing circuit and storing instructions for execution by the processing circuit for performing a method. The method includes obtaining processing control based on execution of a load instruction and a determination that an object pointer to be loaded indicates a location within a selected portion of memory undergoing a garbage collection process. The determination includes identifying a base address and size of a first memory block subject to the garbage collection, and assigning a binary value to each first memory block section. The method further includes obtaining an image of the load instruction and calculating a pointer address from the image, determining whether the object pointer is to be modified, modifying the object pointer to provide a modified object pointer, and storing the modified object pointer in a selected location.

In yet another aspect, a method is provided for facilitating garbage collection within a computing environment. The computer program product includes computer readable storage medium readable by a processing circuit and storing instructions for execution by the processing circuit for performing a method. The method includes obtaining processing control based on execution of a load instruction and a determination that an object pointer to be loaded indicates a location within a selected portion of memory undergoing a garbage collection process. The determination includes identifying a base address and size of a first memory block subject to the garbage collection, and assigning a binary value to each first memory block section, including assigning a binary value corresponding to an enabled section. The method further includes obtaining an image of the load instruction and calculating a pointer address from the image, determining whether the object pointer is to be modified, modifying the object pointer to provide a modified object pointer, and storing the modified object pointer in a selected location.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
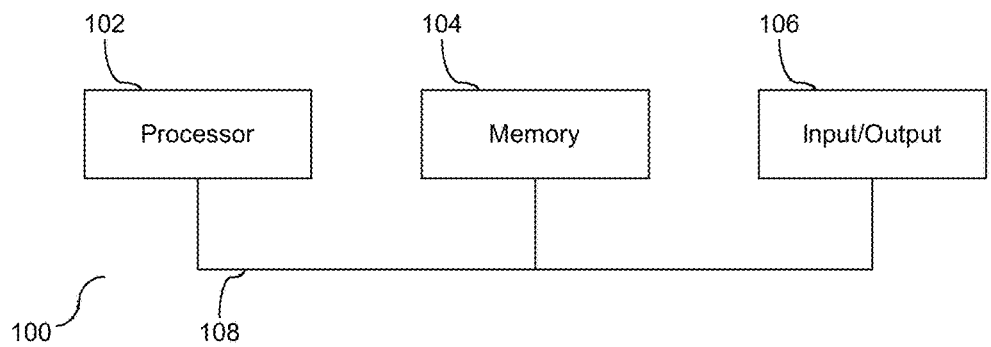
FIG. 1 depicts a block diagram illustrating a computing environment to incorporate and use one or more aspects, in accordance with an embodiment.

It will be readily understood that the components of the embodiments, as generally described and illustrated in the Figures herein, may be arranged and designed in a wide variety of different configurations. Thus, the following detailed description of the embodiments of the apparatus and the method, as presented in the Figures, is not intended to limit the scope of the embodiments, as claimed, but is merely representative of the selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In accordance with one or more aspects, a capability is provided for an optimized garbage collection process that advantageously improves application performance, improves performance of the processor executing the application, and/or improves performance of the computing environment in which the processor executes.

The optimized garbage collection process allows applications (also referred to as programs) that are accessing objects in an area of memory not undergoing garbage collection to continue processing during garbage collection without interruption, allows applications accessing objects in an area of memory being garbage collected to continue processing after a very short unnoticeable delay, and further improves the handling of the object pointers (also referred to as pointers). In one embodiment, an instruction, referred to as a load monitored doubleword indexed (ldmx) instruction, is provided and used whenever an application accesses a pointer to an object in memory. When such an instruction accesses a pointer that indicates an object that lies within a given address range, the processor causes an asynchronous branch (referred to as an Event-Based Branch (EBB)) to a pointer update handler (also referred to as a garbage collection handler, an EBB handler, or handler). This enables the pointer update handler to update the pointer (e.g., the address of the object) if the object pointed to has been moved during an ongoing garbage collection process or is moved by the handler. In order to update the pointer, the handler needs to know its address. In one embodiment of the instruction, the address of the pointer is calculated internally by the hardware during execution of the ldmx instruction, and is not available to the pointer update handler. Thus, in order to determine the address of the pointer, the pointer update handler examines the ldmx instruction to determine the source registers, reads the source registers, and calculates the address of the pointer based on contents of the source registers.

With reference to FIG. 1, a block diagram (100) is provided illustrating a computing environment to incorporate and use one or more aspects. The computing environment includes a processor (102) (e.g., a central processing unit), memory 104 (e.g., main memory), and one or more input/output (I/O) devices and/or interfaces (106) coupled to one another via, for example, one or more buses (108) and/or other connections.

In one embodiment, processor (102) is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In another example, processor (102) is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-09, Tenth Edition, September, 2012, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor (102) is based on an Intel architecture offered by Intel Corporation. Intel® is a registered trademark of Intel Corporation, Santa Clara, Calif. Yet further, processor (102) may be based on other architectures. The architectures mentioned herein are merely provided as examples.

Figure 2:
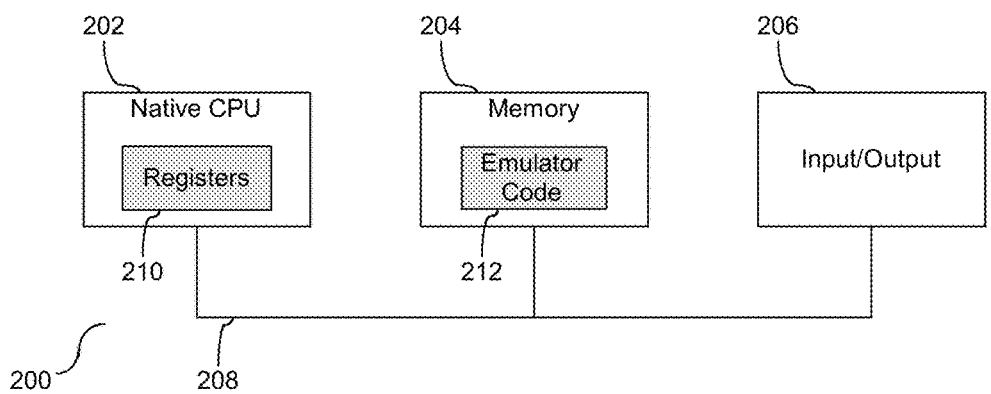
FIG. 2 depicts a block diagram illustrating a computing environment to incorporate and use one or more aspects, in accordance with an alternative embodiment.

Another embodiment of a computing environment to incorporate and use one or more aspects is described with reference to FIG. 2. In this example, a computing environment (200) includes, for instance, a native central processing unit (202), memory (204), and one or more input/output devices and/or interfaces (206) coupled to one another via, for example, one or more buses (208) and/or other connections. As examples, computing environment (200) may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit (202) includes one or more native registers (210), such as one or more general purpose registers and/or one or more special purpose registers used during processing within the environment. These registers include information that represent the state of the environment at any particular point in time.

Moreover, native central processing unit (202) executes instructions and code that are stored in memory (204). In one particular example, the central processing unit executes emulator code (212) stored in memory (204). This code enables the processing environment configured in one architecture to emulate another architecture. For instance, emulator code (212) allows machines based on architectures other than the Power architecture, such as zSeries servers, pSeries servers, HP Superdome servers or others, to emulate the Power architecture and to execute software and instructions developed based on the Power architecture. In a further example, emulator code (212) allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 3:
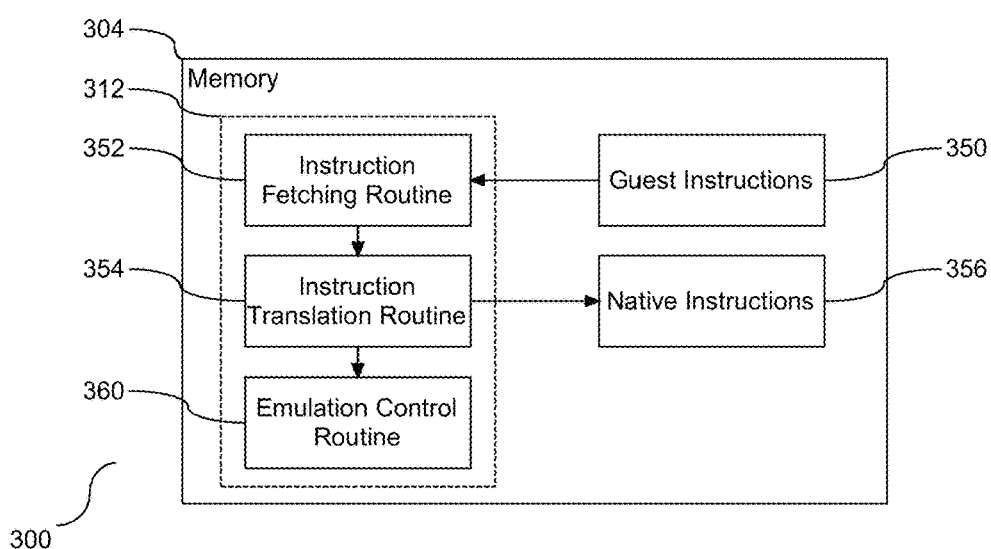
FIG. 3 depicts a block diagram illustrating further details with respect to the memory of FIG. 2.

Further details relating to emulator code (212) are described with reference to FIG. 3. As shown, FIG. 3 is a block diagram (300) of a computing environment. Guest instructions (350) stored in memory (304) comprise software instructions (e.g., correlating to machine instructions) that were developed to be executed in an architecture other than that of a native CPU. For example, guest instructions (350) may have been designed to execute on a PowerPC processor or a z/Architecture processor, such as processor (102) of FIG. 1, but instead, are being emulated on a native CPU, such as native CPU (202). The native CPU may be, for example, an Intel Itanium II processor. In one example, emulator code (312) includes an instruction fetching routine (352) to obtain one or more guest instructions (350) from memory (304), and to optionally provide local buffering for the instructions obtained. It also includes an instruction translation routine (354) to determine the type of guest instruction that has been obtained and to translate the guest instruction into one or more corresponding native instructions (356). This translation includes, for instance, identifying the function to be performed by the guest instruction and choosing the native instruction(s) to perform that function.

Further, emulator code (312) includes an emulation control routine (360) to cause the native instructions to be executed. Emulation control routine (360) may cause a native CPU to execute a routine of native instructions that emulate one or more previously obtained guest instructions and, at the conclusion of such execution, return control to the instruction fetch routine to emulate the obtaining of the next guest instruction or a group of guest instructions. Execution of the native instructions (356) may include loading data into a register from memory (304); storing data back to memory from a register; or performing some type of arithmetic or logic operation, as determined by the translation routine.

Each routine is, for instance, implemented in software, which is stored in memory and executed by a native central processing unit. In other examples, one or more of the routines or operations are implemented in firmware, hardware, software or some combination thereof. The registers of the emulated processor may be emulated using registers of the native CPU or by using locations in memory (304). In embodiments, the guest instructions (350), the native instructions (356), and the emulator code (312) may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction (350) that is obtained, translated and executed is an instruction described herein. The instruction, which is of one architecture (e.g., the Power architecture or z/Architecture) is fetched from memory, translated and represented as a sequence of native instructions (356) of another architecture (e.g., the z/Architecture, Power architecture, Intel architecture, etc.). These native instructions are then executed.

Figure 4:
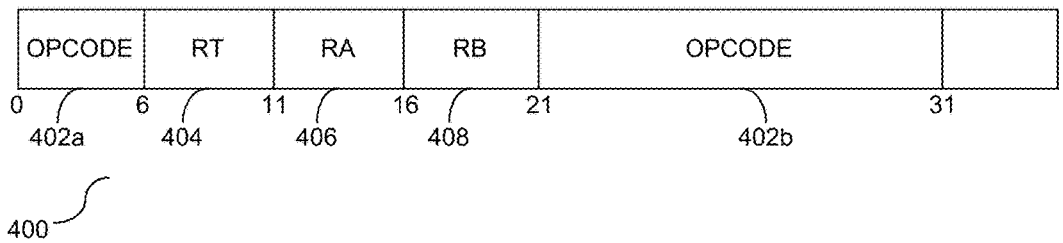
FIG. 4 depicts an illustrative example of a load monitored doubleword indexed instruction, in accordance with an embodiment.

One instruction used in accordance with one or more aspects is the load doubleword instruction used to load data, including object pointers. One particular implementation of the load doubleword instruction in the Power Architecture is described with reference to FIG. 4. In one example, a load doubleword indexed (ldmx) instruction (400) includes operation code (opcode) fields (402a) (e.g., bits 0-5), (402b) (e.g., bits 21-30) indicating a load operation; a result field (RT) (404) (e.g., bits 6-10) used to indicate a register to store a result of the load operation; a register field (RA) (406) (e.g., bits 11-15) used to specify a register to be used by the load operation; and a second register (RB) (408) (e.g., bits 16-20) used to specify a second register to be used by the load operation. Each of the fields (404)-(408), in one example, is separate and independent from one another; however, in other embodiments, more than one field may be combined. Further information on the use of the fields is described below.

In operation of the ldmx instruction, a check is made as to whether the data to be loaded (e.g., the object pointer) points to an object located in a selected portion of memory, referred to herein as a load monitored region. If the data to be loaded does not point to an object located in the selected portion of memory, then a conventional load is performed. For instance, in one example, the load is performed as if a load doubleword indexed instruction (e.g., in the Power Architecture) is being executed.

In one embodiment, the load doubleword indexed (ldx) instruction has the same format as the load monitored doubleword indexed instruction, except the opcode is different. In operation of the ldx instruction: Let an effective address (EA) be the sum (RA|0)+(RB). The doubleword in storage addressed by EA is loaded into RT.

One example of pseudo-code for the ldx instruction is as follows:

If RA=0 then b←0
else b←(RA)
EA←b+(RB)
RT←MEM(EA, 8)

wherein EA is an address of the object pointer, and MEM(EA, 8) is the object pointer.

Continuing with the ldmx instruction, if, however, the data to be loaded points to an object located in the selected portion of memory undergoing garbage collection, then processing is interrupted causing an Event Based Branch to an update pointer handler that performs one or more tasks related to garbage collection, including updating the pointer, if needed, as described herein further below.

One example of pseudo-code for the ldmx instruction is as follows:

If RA=0 then b←0
else b←(RA)
EA←b+(RB)
loaded_ea←MEM(EA, 8)
if—((loaded_ea is in enabled section of load-monitored region) & $BESCR_{GE\ LME}$=0b11)
RT←loaded_ea wherein loaded_ea is the object pointer; EA is an address of the object pointer; BESCR refers to branch event status-control register; GE refers to general enable; and LME=load monitored enabled.

Although, in the examples herein, the instruction format is for the Power Architecture, similar formats may be used for other architectures.

Further, in other embodiments, a load doubleword monitored (ldm) instruction may be used that behaves like ldmx except that the EA accessed would be calculated like a load doubleword (ld) instruction using RA and DS fields instead of operands RA and RB as with ldx. With the ld instruction, let an effective address (EA) be the sum (RA|0)+(DS||0b00). The doubleword in storage addressed by EA is loaded into RT.

One example of pseudo-code for the ld instruction is as follows:

If RA=0 then b←0
else b←(RA)
EA←b+EXTS(DS||0b00)
RT←MEM(EA, 8)

Figure 5:
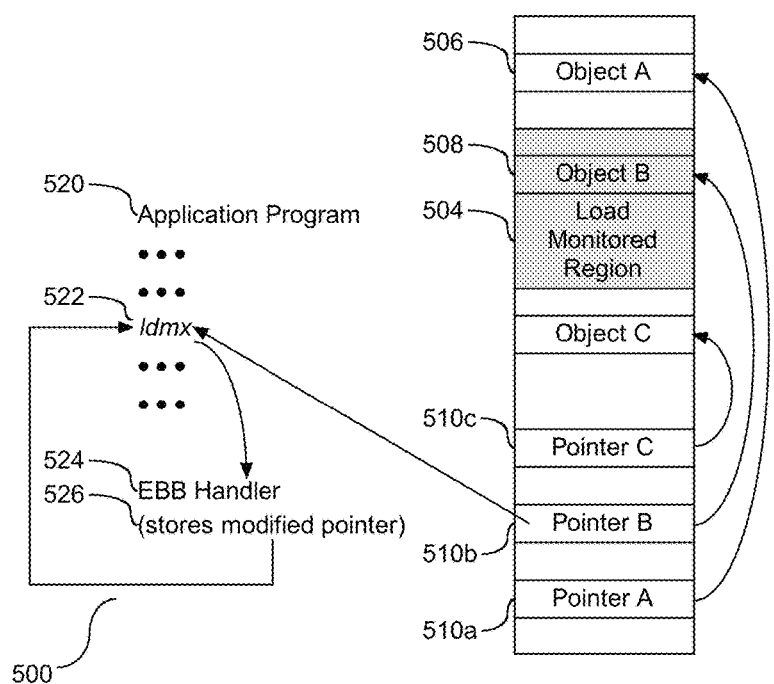
FIG. 5 depicts a block diagram illustrating detail of memory for which garbage collection is to be performed, in accordance with an embodiment.

In one embodiment, as indicated previously, the selected portion of memory undergoing garbage collection (e.g., a memory block of user address space) is referred to herein as the load monitored region. Referring to FIG. 5, a block diagram (500) is shown illustrating memory, and specifically regions within the memory. As shown, memory (502) includes a load monitored region (504), as well as a plurality of objects, including $Object_A$ (506) and $Object_B$ (508). As shown, $Object_B$ (508) is in the load monitored region (504), meaning that the object is in a portion of memory in which garbage collection is being performed. Therefore, the current pointer may need to be updated, if the object to which the pointer points has been moved due to, for instance, the garbage collection process.

Further, as used herein, an object area includes the load monitored region and the area of memory including objects that are not undergoing garbage collection. Additionally, in one embodiment, memory (502) includes a plurality of pointers shown as $pointer_A$ (510a), $pointer_B$ (510b), and $pointer_C$ (510c).

In this figure, it is further shown that an application program (520) executes an ldmx instruction (522), which attempts to load $pointer_B$ (510b). $Pointer_B$ (510b) points to $Object_B$ (508) in the load monitored region, and thus, an interrupt is performed giving control to the EBB handler (524) (also known as the update pointer handler, or handler). In one embodiment, the handler (524) calculates a pointer address for $Pointer_B$ (510b) from an image of the load monitored instruction, modifies the pointer, if necessary, and if modified stores the pointer in the location from which it was obtained (526). Processing then returns to the instruction, which is re-executed. Details of the pointer address calculation are shown in the pseudo code described above.

In a further embodiment, the handler modifies the pointer, stores the modified pointer in the target register of the instruction, and processing continues at the instruction after the ldmx instruction, thereby emulating the load of the pointer. In one or more aspects, the application is unaware of the EBB processing, and simply receives the pointer, as before.

Figure 6:
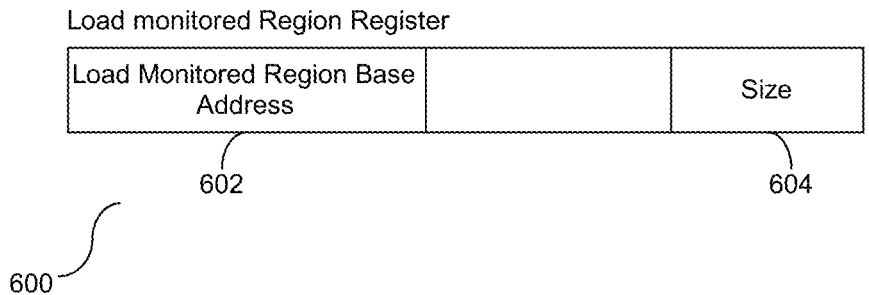
FIG. 6 depicts an illustrative example of a load monitored region register, in accordance with an embodiment.

As indicated above, interrupt processing is performed when the data to be loaded (e.g., the object pointer) points to an object that is in the load monitored region of memory. The load monitored region may be identified in alternative ways. For instance, in one implementation, its size and base address are stored in a register, such as depicted in FIG. 6. As shown, a load monitored region register (LMRR) (600) includes, for instance, a field (602) including a load monitored region base address, and a field (604) including a size of the region.

In one example, the load monitored region base address includes the high-order bits of the load monitored region. In this embodiment, it is assumed that the load monitored region is aligned on a granularity of its size. The size field is encoded such that each value corresponds to a specified size. For example, if 16 possible sizes are needed, the size field has 4 bits. Typical sizes are in the order of 10's of MBs (megabytes) to over a GB (gigabyte). The number of bits in the load monitored region base address field can be derived from the minimum size supported. For example, if the minimum size supported is 16 MB, then the load monitored region base address field is 40 bits, which is sufficient to identify any 16 MB memory region aligned on a 16 MB address boundary. When the size field indicates smaller sizes, then more bits are required to specify the base address.

In other examples, the size and base address may be specified in a memory location, or a register used for another purpose, etc. Additionally, other information may be used to specify the address range of the load monitored region.

In some embodiments, the load monitored region is subdivided into segments of equal size, where each segment is 1/Nth of the total load monitored region size. Such embodiments include a Load Monitored Segment Enable Register (LMSER) where each bit corresponds to a segment. For example, a 64-bit register could be used to subdivide a load monitored region into 64 segments, where each segment is $1/64^{th}$ of the total load monitored region.

Figure 7:
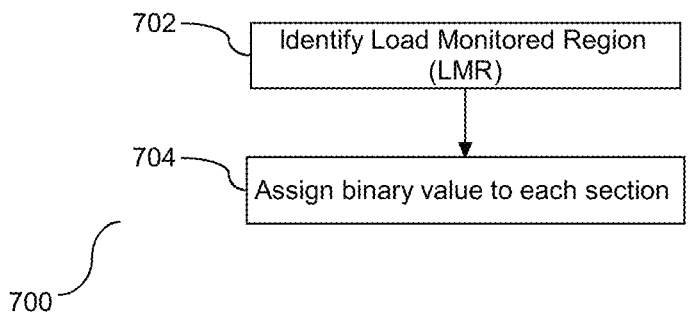
FIG. 7 depicts a flowchart illustrating a process for configuring the LMRR and LMSER, in accordance with an embodiment.

Now with reference now to FIG. 7 a flowchart (700) is provided illustrating a process for configuring the LMRR and LMSER, in accordance with an embodiment. First, the load monitored region (LMR) is specified in the LMRR (702). Details of such specification have been described above, with reference to FIG. 6. Then a binary value is assigned to each section in the LMSER (704), where a first binary value corresponds to an enabled section (i.e., a section of the load monitored region that is identified for garbage collection), and a second binary value corresponds to a disabled section (i.e., a section that is not subject to garbage collection).

Figure 8:
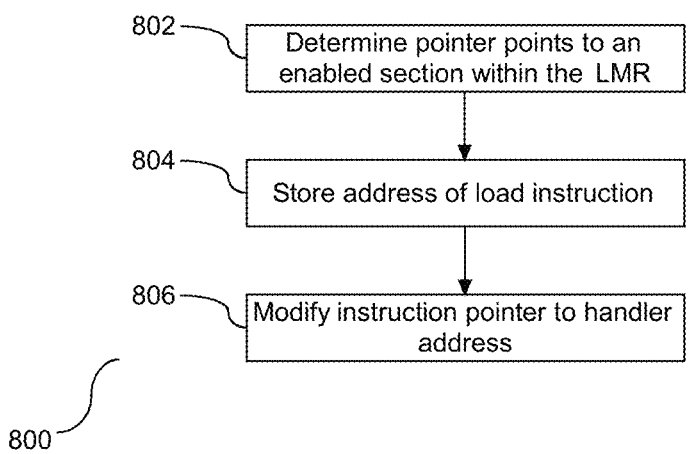
FIG. 8 depicts a flowchart illustrating a process for causing execution to divert from a load instruction to a pointer update handler, or handler, in accordance with an embodiment.

With reference now to FIG. 8, a flowchart (800) is provided illustrating a process for causing execution to divert from a load instruction to a pointer update handler, or handler, in accordance with an embodiment. In response to determining that a pointer that was read points to an enabled section within the load monitored region (LMR) (802), as described, for example, at step (702) of FIG. 7, the address of the load instruction is stored (804). In one embodiment, the load instruction address is stored into an event based branch return register (EBBRR). An instruction pointer is then modified to point to an address of the handler (806). In one embodiment, the handler address is contained in an event based branch handler register (EBBHR), and is used to in the modification of step (806). Step (806) may include setting a load monitored event occurred (LMO) bit of the branch event status and control register (BESCR) to a first binary value indicating a load monitored exception has occurred.

Figure 9:
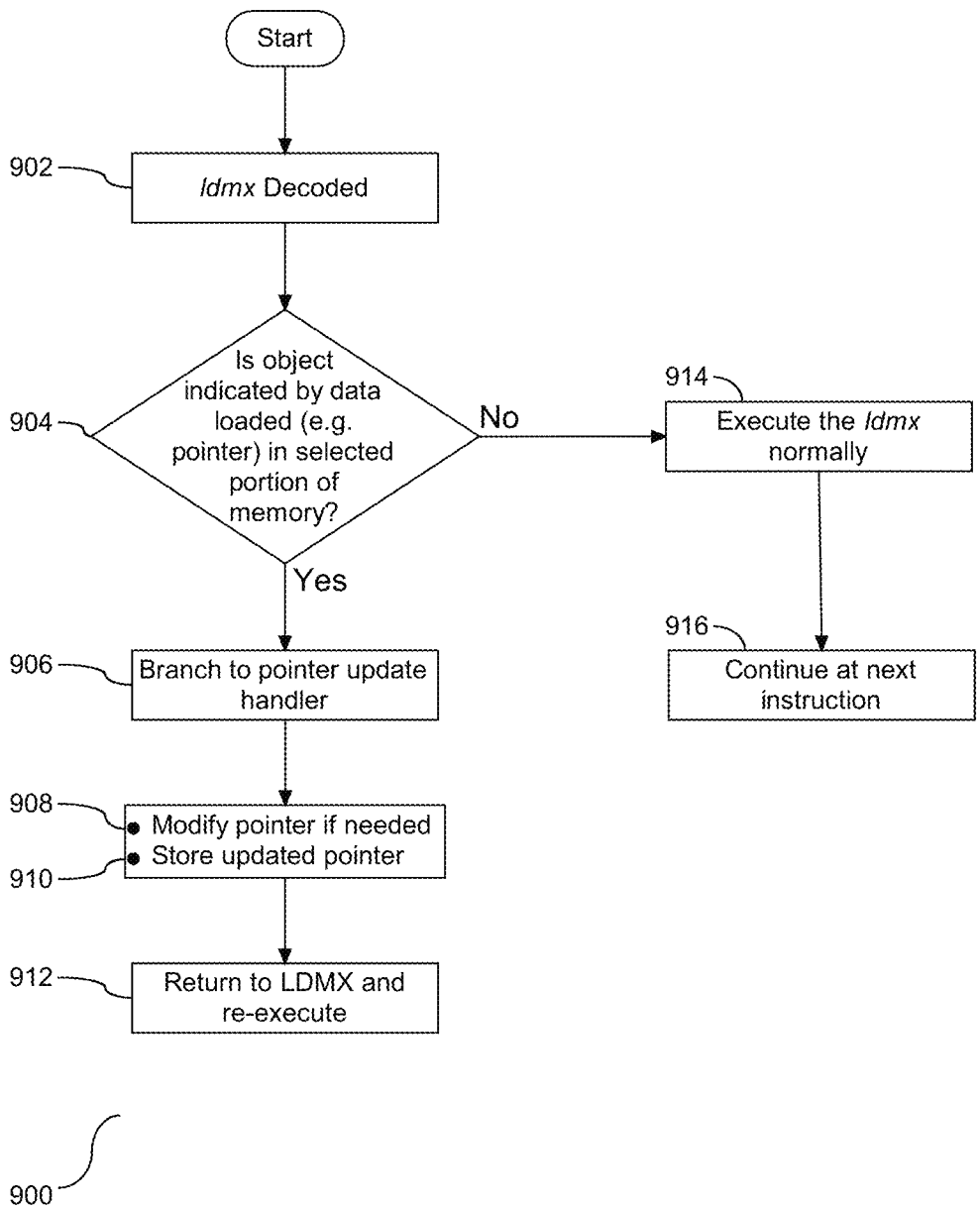
FIG. 9 depicts an illustrative example of logic to perform garbage collection using the load monitored doubleword indexed instruction, in accordance with one or more aspects.

Referring now to FIG. 9, a flowchart (900) is provided illustrating logic associated with executing the ldmx instruction in accordance with an embodiment. In one implementation, hardware of a processor executes an application that issues the ldmx instruction, and the processor hardware decodes the ldmx instruction (902). During execution of the instruction, the processor hardware determines the memory location access, and compares the data (i.e., the pointer) read with the load monitored region register (or other register or memory location) that specifies the selected portion of memory undergoing the garbage collection (904). If the pointer that was read points to a location within the load monitored region, then the hardware causes a lightweight interrupt (e.g., an Event Based Branch that does not involve the supervisor) that diverts execution to the pointer update handler (906). The handler obtains an image of the instruction and using the image, the handler calculates a pointer address from the image, with the pointer address specifying a location of the object pointer. Details of the calculation are shown in the pseudo code described above. The handler also modifies the pointer (908), if needed (e.g. if the object to which it points was moved during garbage collection), performs other garbage collection tasks as needed and as time permits, and stores the pointer, if modified (910). If the object is moved, then the handler can return control to the application and re-execute the ldmx (912). In a further embodiment, the modified object pointer is stored in a location specified by the ldmx instruction, and the handler returns control to the application at the instruction after the ldmx. As an example, the update handler reads the ldmx target register, and stores the modified pointer in the ldmx target register. This has the effect of emulating a load of the modified pointer.

Alternatively, if the object is not moved, then the update handler does not modify the pointer, and the unmodified pointer is stored in the ldmx target register. This has the effect of emulating a load of the unmodified pointer.

Returning to inquiry (904), if the pointer that was read does not point to a location within the load monitored region, then the processor hardware does not cause the Event Based Branch, but instead executes the ldmx instruction without the interrupt, (914). For instance, the ldmx instruction is processed as if the load doubleword indexed instruction was executed, as described above. In particular, in one example, the pointer is read from the location identified by the instruction and it is stored in the target register. Thereafter, processing continues to the next instruction, (916).

As described herein, garbage collection is optimized by allowing applications to continue processing (without being paused due to garbage collection) when those applications are not accessing objects in an area of memory undergoing garbage collection. Further, garbage collection is optimized by allowing applications accessing objects in an area of memory undergoing garbage collection to immediately resume processing after a very brief delay during the time the lightweight interrupt handler processes the pointer. This is enabled by determining during the load of the pointer that the object is in the selected portion of memory undergoing garbage collection, and based thereon, causing an interrupt to occur such that the handler may obtain the address of the pointer to directly access the pointer.

Figure 10:
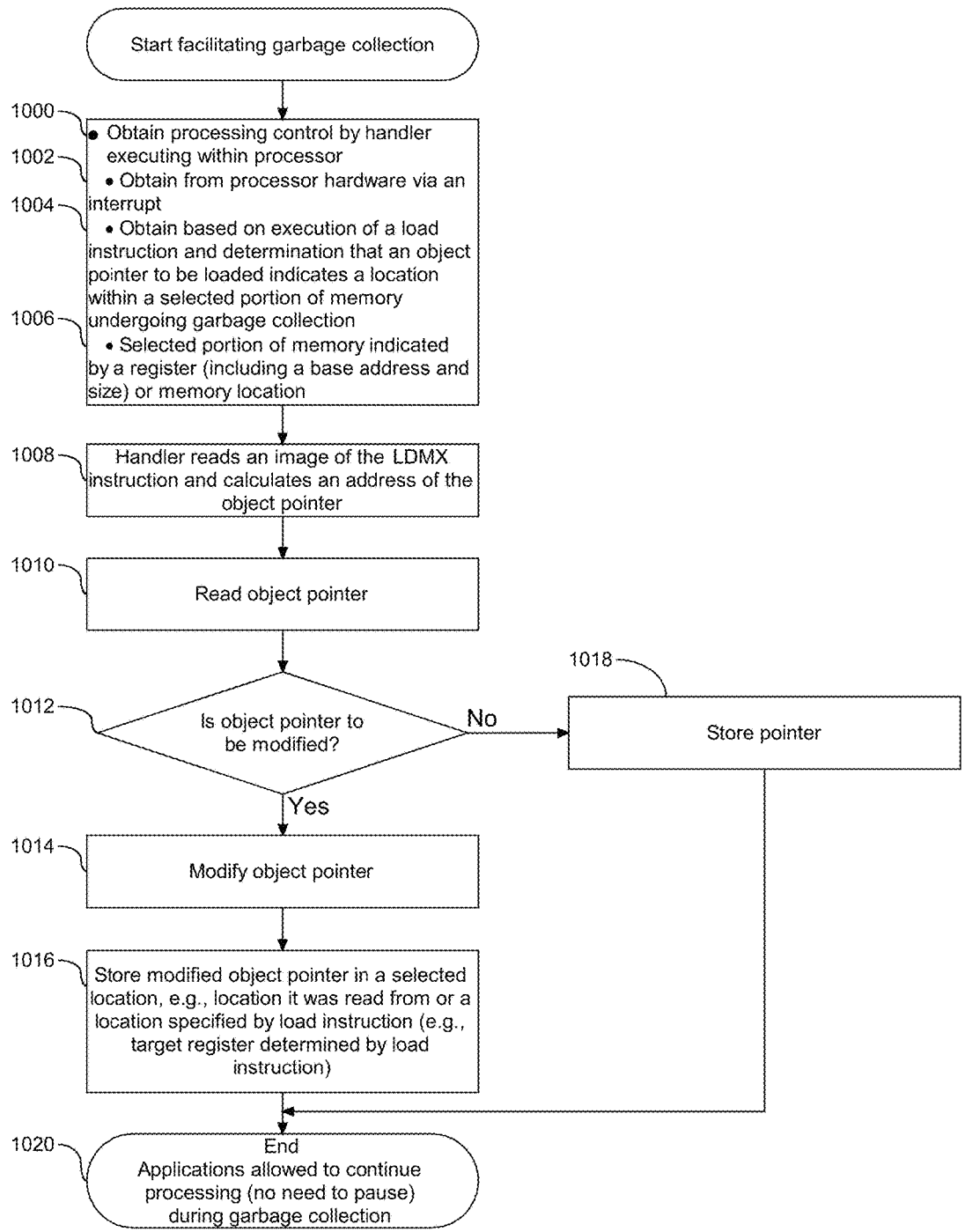
FIG. 10 depicts one embodiment of logic to perform optimized garbage collection, in accordance with one or more aspects.

One embodiment of the logic associated with facilitating garbage collection, in accordance with one or more aspects is described with reference to FIG. 10. Initially, a handler executing within a processor obtains processing control, (1000), via, for instance, an interrupt issued by processor hardware, (1002). Processing control is obtained by the handler without supervisor involvement based on execution of a load instruction (e.g., ldmx) and a determination that an object pointer to be loaded indicates a location within a selected portion of memory undergoing garbage collection, (1004). The selected portion of memory is indicated by a register that may include a base address and a size, or a memory location, as examples, (1006).

Based on obtaining processing control, the handler reads an image of the ldmx instruction and calculates an address of the object pointer (1008). The address specifies a location of the object pointer.

The handler then reads the object pointer, (1010). The handler then determines if the object pointer is to be modified, (1012). For instance, the handler determines whether the object pointed to by the object pointer has been moved. If the object has been moved, then the object pointer is modified, (1014). Thereafter, the modified object pointer is stored in a selected location, (1016). For instance, it is stored in the location it was read from (e.g., calculated from the instruction image), and control is returned to the application at the ldmx instruction, which is re-executed. In a further embodiment, the modified object pointer is stored in a location specified by the ldmx instruction (e.g. the ldmx target register) and the handler returns control to the application at the instruction after the ldmx.

Returning to step (1012), if the object pointer is not modified, it is stored, for instance, in the target register of the ldmx instruction (1018), and the handler returns control to the application at the instruction after the ldmx. This has the effect of emulating a load of the unmodified pointer.

Advantageously, in one or more aspects, garbage collection is facilitated by allowing applications that are not accessing objects in the selected portion of memory to continue processing (that is, no need to pause) during garbage collection, (1020). Also, applications that are accessing objects in the selected portion of memory are only delayed briefly.

Figure 11:
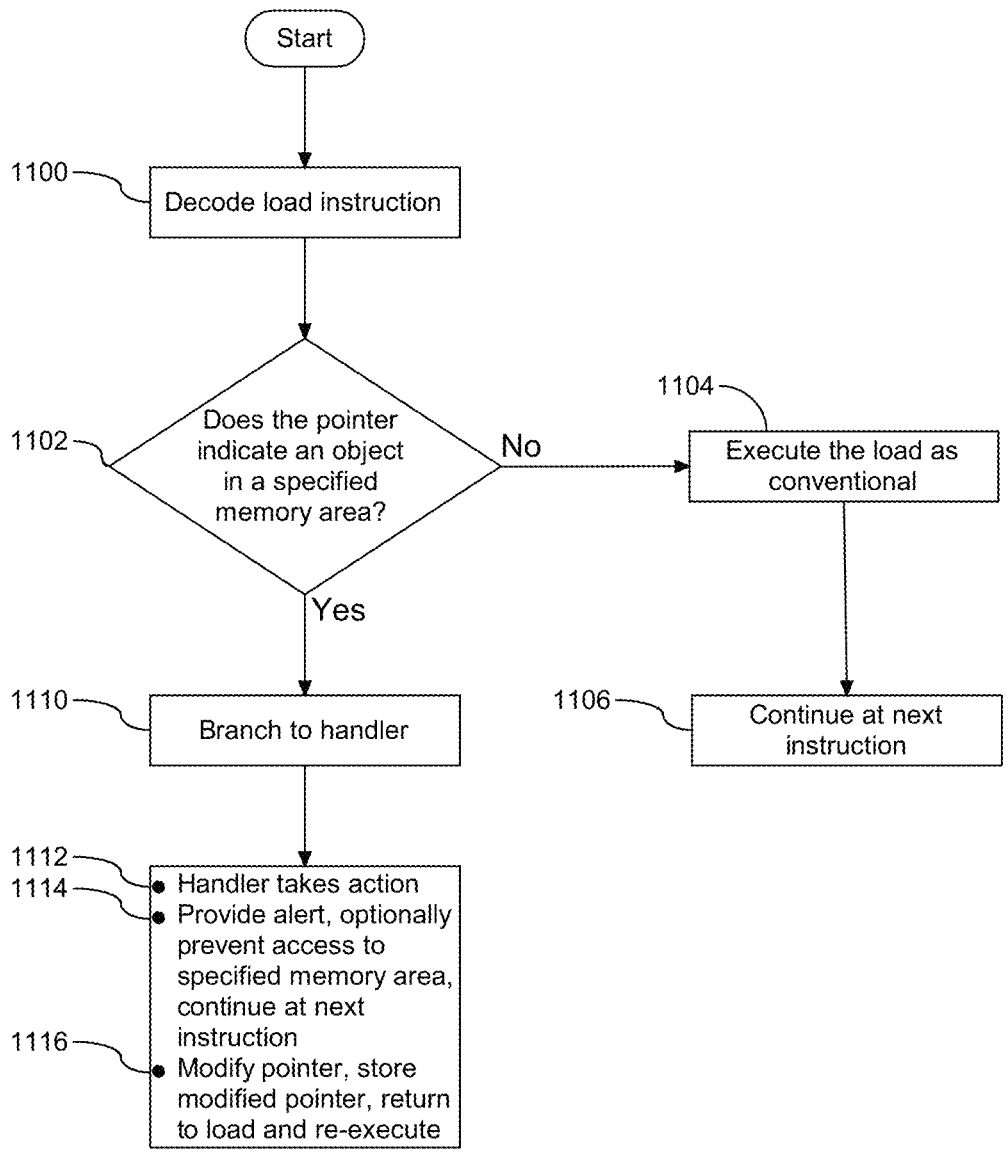
FIG. 11 depicts one embodiment of logic to take action by a handler based on a specified condition, in accordance within one or more aspects.

Additionally, one or more aspects may be used for other than garbage collection. For example, since one or more aspects described herein may be used to detect when a pointer to a specified storage address range is loaded, it may be used to provide an advance warning about imminent access into a restricted memory space. In this case, a memory region is initialized to be the restricted memory region, and the pointer storage area is set to indicate the location of the memory pointers. Subsequently, when a pointer in the pointer storage area is read that points to a restricted area, an EBB occurs. For example, one embodiment of logic to take action by a handler based on a specific condition is described with reference to FIG. 11. In one example, a load instruction is decoded, (1100). The load instruction may be one of various load instructions, including the 1*dm* or ldmx instruction, as examples. The load instruction is decoded and based on the decoding, the object pointer is determined. A determination is made as to whether the object pointer indicates an object in a specified memory area, (1102). This memory area is, for instance, a specified storage address range that is to be restricted for one reason or the other. If the pointer does not indicate an object in the specified memory area, then the ldmx (or other instruction) is executed as conventional, (1104). Processing then continues at the next instruction, (1106).

However, returning to (1102), if the pointer does indicate an object in a specified memory area, then control is obtained by a handler, (1110). For instance, the processor hardware performs an interrupt (e.g., a lightweight interrupt that does not involve the operating system) to the handler (e.g., an application-level handler). The handler may then take one or more actions, (1112). For instance, in one embodiment, the handler provides an alert, optionally prevents access to the specified memory area, and then continues processing at the next instruction, (1114). As a further example, the handler obtains the pointer address (e.g., calculates it from the instruction), reads the pointer, modifies the pointer, stores the modified pointer back in the location from which it was read, and returns control to the instruction and re-executes the instruction, such that the specified memory area is not accessed, (1116). Other possibilities also exist.

As described herein, garbage collection is optimized by allowing applications that are accessing objects in an area of memory not being garbage collected to continue processing (without being paused) during garbage collection, and allowing applications that are accessing objects in an area of memory being garbage collected to resume processing after a short, unnoticeable delay. This is enabled by determining, during the load of the pointer, that the address of the object pointer is located in a pointer storage area and the object being pointed to is in the selected portion of memory undergoing garbage collection. Thus, an interrupt is issued to a handler that manages the pointer. In one embodiment, the handler calculates the address of the pointer from the image of the ldmx instruction.

In accordance with one or more aspects, upon each access to an object pointer, processing may be diverted to a real-time garbage collection handler (e.g., pointer update handler) if the pointer is located in a pointer storage area and points to an object in a region of memory being garbage collected.

As described herein, garbage collection is facilitated. In one embodiment, processing control is obtained by a handler executing within a processor of the computing environment, the obtaining processing control being based on execution of a load instruction and a determination that an address of an object pointer to be loaded is located in a pointer storage area and the object pointer indicates a location within a selected portion of memory undergoing garbage collection. Based on obtaining processing control by the handler, the handler obtains from the pointer storage area the object pointer, the object pointer indicating a location of an object pointed to by the object pointer. The handler determines whether the object pointer is to be modified, and based on determining the object pointer is to be modified, the object pointer is modified to provide a modified object pointer. Based on modifying the object pointer, the modified object pointer is stored in a selected location, such as a location within the pointer storage area or a location specified by the load instruction.

Advantageously, this allows applications using objects in an area of memory not undergoing garbage collection to continue processing during garbage collection without interruption, allows an application using an object in an area of memory undergoing garbage collection to continue processing after a very brief, unnoticeable delay, and does not require the use of special instructions or program modifications, thereby improving performance.

In one further embodiment, the selected portion of memory undergoing garbage collection is part of an object area that also includes one or more other objects not undergoing garbage collection, and advantageously, one or more applications accessing the object area not undergoing garbage collection continue process during garbage collection. For instance, they continue executing without interruption. Further, in one embodiment, the application that accessed the object pointer that indicates an object in the selected portion of memory undergoing garbage collection immediately resumes processing after a very brief delay during the time the handler (e.g., application-level handler) processes the pointer. This enables applications to be used for time-sensitive processing because no application is delayed for a time period that is significant enough to be noticeable.

Additionally, one or more aspects may be used for other than garbage collection. For example, since one or more aspects described herein may be used to detect when a pointer to a specified storage address range is loaded, it may be used to provide an advance warning about imminent access into a restricted memory space. In this case, a memory region is initialized to be the restricted memory region, and the pointer storage area is set to indicate the location of the memory pointers. Subsequently, when a pointer in the pointer storage area is read that points to a restricted area, an event-based branch (EBB) occurs. The EBB handler can then either prevent the access entirely, provide an advance warning signal to a security monitor that an access is about to be made into a restricted area of memory or perform some other selected action. Other related applications are possible in situations in which there is a desire for an alert about an expected access that is about to be made to a specified memory area.

As used herein, storage, central storage, main storage, memory and main memory are used interchangeably, unless otherwise noted, implicitly by usage or explicitly. One or more aspects may relate to shared resources through cloud computing. It is to be understood and appreciated that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 12:
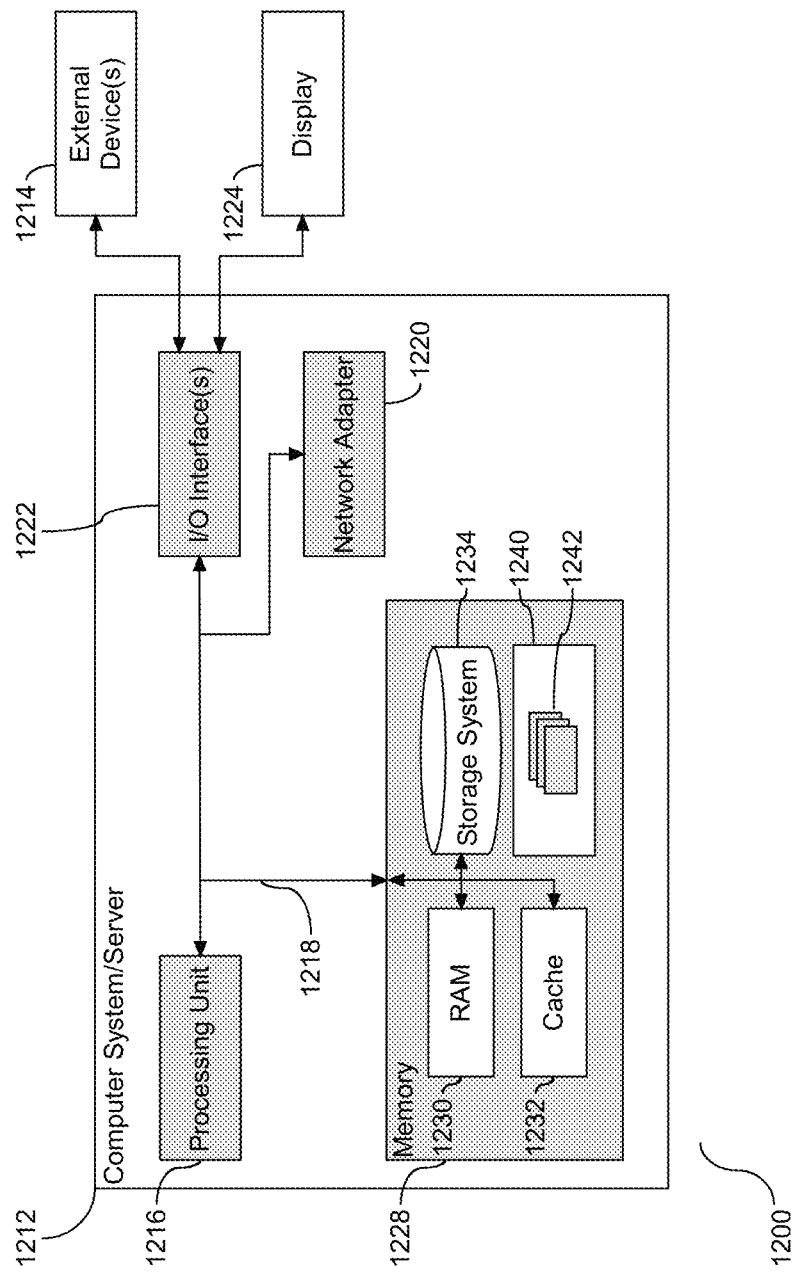
FIG. 12 depicts a block diagram illustrating a system to perform a garbage collection process, in accordance with an embodiment.

Referring now to FIG. 12, a schematic of a system (1200) is provided. In one embodiment, system (1200) is a cloud computing node. The cloud computing node is only one example of a suitable cloud computing node and is not intended to suggest any limitation as to the scope of use or functionality of embodiments of the invention described herein. Regardless, the cloud computing node is capable of being implemented and/or performing any of the functionality set forth hereinabove.

In the cloud computing node is a computer system/server (1212), which is operational with numerous other general purpose or special purpose computing system environments or configurations. Examples of well-known computing systems, environments, and/or configurations that may be suitable for use with computer system/server (1212) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (1212) may be described in the general context of computer system executable instructions, such as program modules, being executed by a computer system. Generally, program modules may include routines, programs, objects, components, logic, data structures, and so on that perform particular tasks or implement particular abstract data types. Computer system/server (1212) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server (1212) is shown in the form of a general-purpose computing device. The components of computer system/server (1212) may include, but are not limited to, one or more processors or processing units (1216), a system memory (1228), and a bus (1218) that couples various system components, including system memory (1228) to processor (1216).

Bus (1218) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (1212) typically includes a variety of computer system readable media. Such media may be any available media that is accessible by computer system/server (1212), and it includes both volatile and non-volatile media, removable and non-removable media.

System memory (1228) can include computer system readable media in the form of volatile memory, such as random access memory (RAM) (1230) and/or cache memory (1232). Computer system/server (1212) may further include other removable/non-removable, volatile/non-volatile computer system storage media. By way of example only, storage system (1234) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1218) by one or more data media interfaces. As will be further depicted and described below, memory (1228) may include at least one program product having a set (e.g., at least one) of program modules that are configured to carry out the functions of embodiments of the invention.

Program/utility (1240), having a set (at least one) of program modules (1242), may be stored in memory (1228) by way of example, and not limitation, as well as an operating system, one or more application programs, other program modules, and program data. Each of the operating system, one or more application programs, other program modules, and program data or some combination thereof, may include an implementation of a networking environment. Program modules (1242) generally carry out the functions and/or methodologies of embodiments of the invention as described herein.

Computer system/server (1212) may also communicate with one or more external devices (1214) such as a keyboard, a pointing device, a display (1224), etc.; one or more devices that enable a user to interact with computer system/server (1212); and/or any devices (e.g., network card, modem, etc.) that enable computer system/server (1212) to communicate with one or more other computing devices. Such communication can occur via Input/Output (I/O) interfaces (1222). Still yet, computer system/server (1212) can communicate with one or more networks such as a local area network (LAN), a general wide area network (WAN), and/or a public network (e.g., the Internet) via network adapter (1220). As depicted, network adapter (1220) communicates with the other components of computer system/server (1212) via bus (1218). It should be understood that although not shown, other hardware and/or software components could be used in conjunction with computer system/server (1212). Examples, include, but are not limited to: microcode, device drivers, redundant processing units, external disk drive arrays, RAID systems, tape drives, and data archival storage systems, etc.

Figure 13:
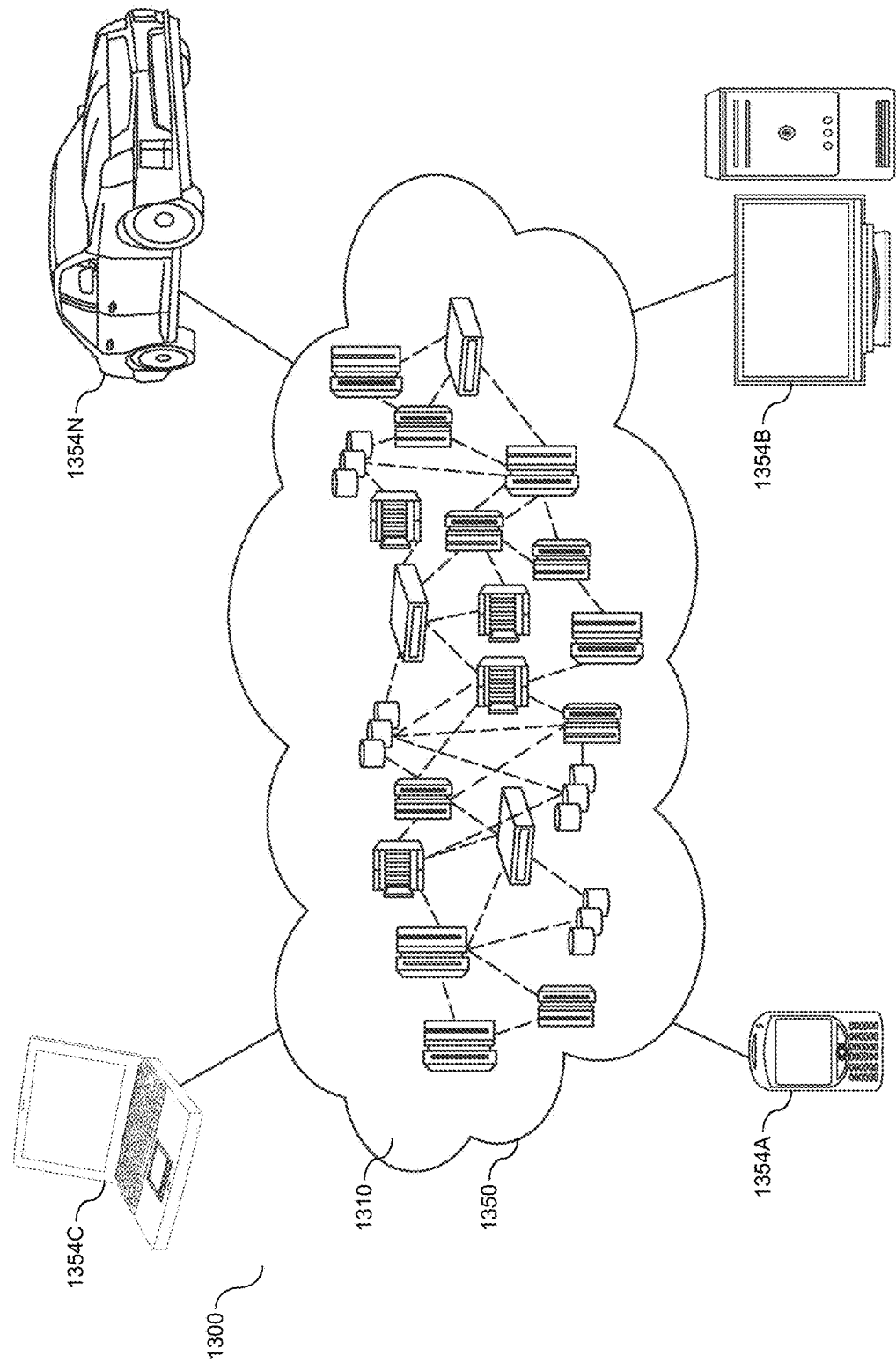
FIG. 13 depicts an illustrative example of a cloud computing environment, in accordance with an embodiment.

Referring now to FIG. 13, an illustrative cloud computing environment (1300) is depicted. As shown, cloud computing environment (1300) comprises one or more cloud computing nodes (1310) with which local computing devices used by cloud consumers, such as, for example, personal digital assistant (PDA) or cellular telephone (1354A), desktop computer (1354B), laptop computer (1354C), and/or automobile computer system (1354N) may communicate. Nodes (1310) may communicate with one another. They may be grouped (not shown) physically or virtually, in one or more networks, such as Private, Community, Public, or Hybrid clouds as described hereinabove, or a combination thereof. This allows cloud computing environment (1300) to offer infrastructure, platforms and/or software as services for which a cloud consumer does not need to maintain resources on a local computing device. It is understood that the types of computing devices (1354A)-(1354N) shown in FIG. 13 are intended to be illustrative only and that computing nodes (1310) and cloud computing environment (1300) can communicate with any type of computerized device over any type of network and/or network addressable connection (e.g., using a web browser).

Figure 14:
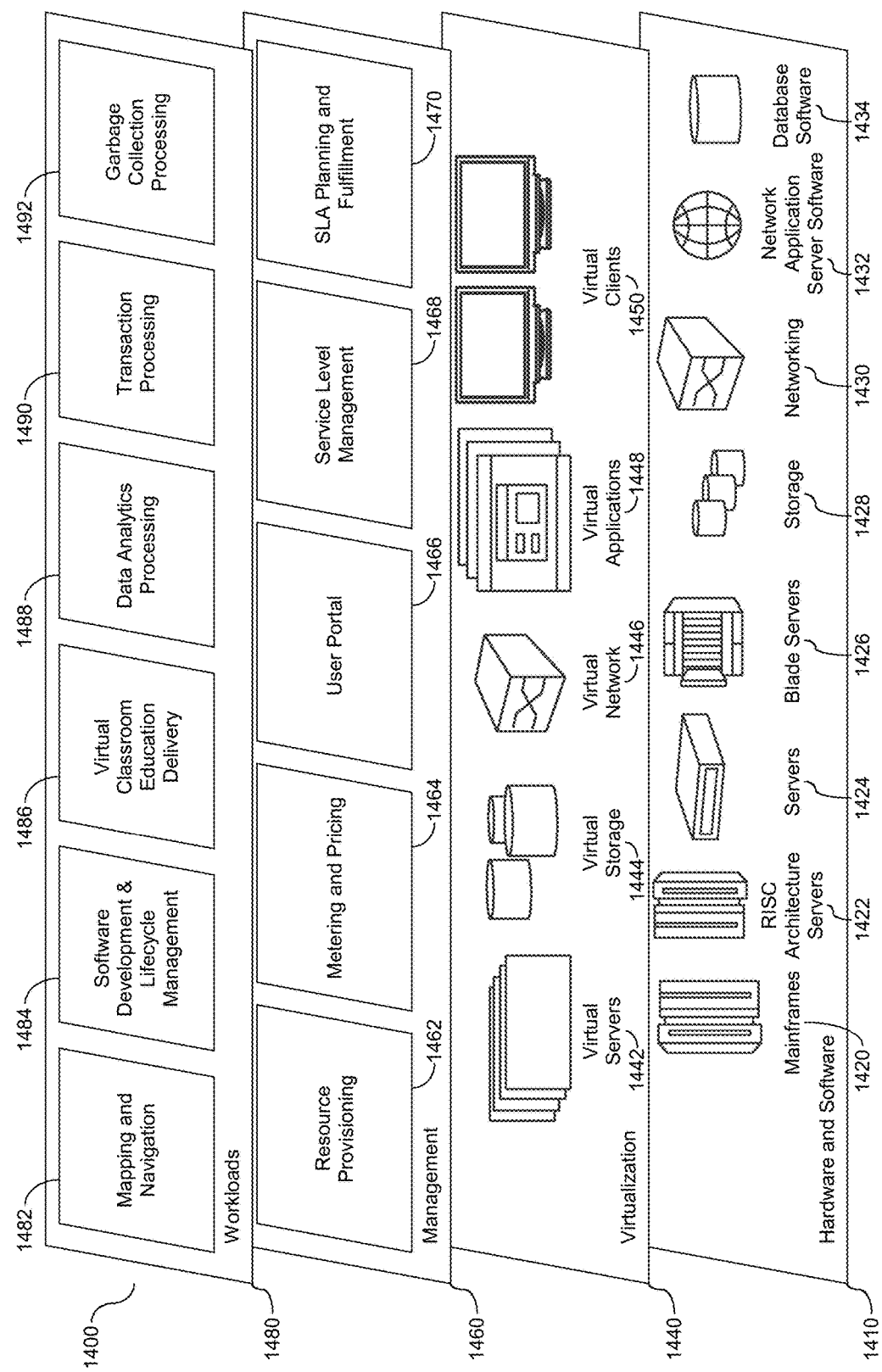
FIG. 14 depicts an illustrative example of abstraction model layers, in accordance with an embodiment.

Referring now to FIG. 14, a set of functional abstraction layers (1400) provided by cloud computing environment (1300) of FIG. 13 is shown. It should be understood in advance that the components, layers, and functions shown in FIG. 14 are intended to be illustrative only and embodiments of the invention are not limited thereto. As depicted, the following layers and corresponding functions are provided:

Hardware and software layer (1410) includes hardware and software components. Examples of hardware components include mainframes (1420); RISC (Reduced Instruction Set Computer) architecture based servers (1422); servers (1424); blade servers (1426); storage devices (1428); networks and networking components (1430). In some embodiments, software components include network application server software (1432) and database software (1434).

Virtualization layer (1440) provides an abstraction layer from which the following examples of virtual entities may be provided: virtual servers (1442); virtual storage (1444); virtual networks (1446), including virtual private networks; virtual applications and operating systems (1448); and virtual clients (1450).

In one example, management layer (1460) may provide the functions described below. Resource provisioning (1462) provides dynamic procurement of computing resources and other resources that are utilized to perform tasks within the cloud computing environment. Metering and Pricing (1464) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal (1466) provides access to the cloud computing environment for consumers and system administrators. Service level management (1468) provides cloud computing resource allocation and management such that required service levels are met. Service Level Agreement (SLA) planning and fulfillment (1470) provide pre-arrangement for, and procurement of, cloud computing resources for which a future requirement is anticipated in accordance with an SLA.

Workloads layer (1480) provides examples of functionality for which the cloud computing environment may be utilized. Examples of workloads and functions which may be provided from this layer include: mapping and navigation (1482); software development and lifecycle management (1484); virtual classroom education delivery (1486); data analytics processing (1488); transaction processing (1490); and garbage collection processing of one or more aspects of the present invention (1492).

As will be appreciated by one skilled in the art, the embodiments described herein may be embodied as a method, a system, or a computer program product. Accordingly, aspects of the embodiments may take the form of an entirely hardware embodiment, an entirely software embodiment (including firmware, resident software, micro-code, etc.) or an embodiment containing software and hardware aspects. Furthermore, aspects of the embodiments may take the form of a computer program product embodied in one or more computer readable medium(s) having computer readable program code embodied thereon.

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of methods, systems, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles and the practical application, and to enable others of ordinary skill in the art to understand the various embodiments with various modifications as are suited to the particular use contemplated. Accordingly, the implementation of a method to manage a garbage collection process executed on a memory block of user address space, and the corresponding system, are not limited to the embodiments described above. It will be appreciated that, although specific embodiments of the invention have been described herein for purposes of illustration, various modifications may be made without departing from the spirit and scope of the invention. For instance, alternative embodiments may include the usage of other hardware components to perform the method. Accordingly, the scope of protection of this invention is limited only by the following claims and their equivalents.

Furthermore, the described features, structures, or characteristics may be combined in any suitable manner in one or more embodiments. In the description provided herein, numerous specific details are provided to demonstrate a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

What is claimed is:

1. A computer system for facilitating garbage collection within a computing environment, the computer system comprising:
    a memory;
    a processor in communication with the memory, the processor to:
        obtain processing control based on execution of a load instruction and a determination that an object pointer to be loaded indicates a location within a selected portion of memory undergoing a garbage collection process;
        wherein the determination comprises:
            identifying a base address and size of a first memory block subject to the garbage collection; and
            assigning a binary value to each first memory block section, including assigning a binary value corresponding to an enabled section; and
    a handler in operative communication with the processor, the handler to:
        obtain an image of the load instruction and calculate a pointer address from the image; and
        determine whether the object pointer is to be modified, wherein:
            if the object pointer is not to be modified, storing an unmodified object pointer in a target register determined by the load instruction; and
            if the object pointer is to be modified, storing a modified object pointer in the target register.

2. The computer system of claim 1, wherein the selected portion of memory is part of an object area that includes one or more other objects not undergoing the garbage collection process.

3. The computer system of claim 2, wherein one or more applications accessing the object area not undergoing the garbage collection process continue to process during the garbage collection process.

4. The computer system of claim 3, further comprising upon an application accessing the object pointer, the processor to use a load monitored doubleword indexed (LDMX) instruction.

5. The computer system of claim 4, further comprising the processor to:
    examine the LMDX instruction to determine a source register;
    read the source register; and
    calculate the pointer address.

6. A computer program product for facilitating garbage collection within a computing environment, the computer program product comprising:
    a computer readable storage medium readable by a processing circuit and storing instructions for execution by the processing circuit for performing a method comprising:
        obtaining processing control based on execution of a load instruction and a determination that an object pointer to be loaded indicates a location within a selected portion of memory undergoing a garbage collection process;
        wherein determining the garbage collection process is being executed within the selected portion of memory further comprising:
            identifying a base address and size of a first memory block subject to the garbage collection; and
            assigning a binary value to each first memory block section, including assigning a binary value corresponding to an enabled section;
        obtaining an image of the load instruction and calculating a pointer address from the image; and
        determining whether the object pointer is to be modified, wherein:
            if the object pointer is not to be modified, storing an unmodified object pointer in a target register determined by the load instruction; and
            if the object pointer is to be modified, storing a modified object pointer in the target register.

7. The computer program product of claim 6, wherein the selected portion of memory is part of an object area that includes one or more other objects not undergoing the garbage collection process.

8. The computer program product of claim 7, wherein one or more applications accessing the object area not undergoing the garbage collection process continue to process during the garbage collection process.

9. The computer program product of claim 8, wherein the method further comprises, upon an application accessing the object pointer, using a load monitored doubleword indexed (LDMX) instruction.

10. The computer program product of claim 9, wherein the method further comprises:
examining the LMDX instruction to determine a source register;
reading the source register; and
calculating the pointer address.

11. The computer program product of claim 6, wherein the base address and size of the first memory block are stored in a register.

12. A method comprising:
obtaining processing control based on execution of a load instruction and a determination that an object pointer to be loaded indicates a location within a selected portion of memory undergoing a garbage collection process;
wherein the determination comprises:
identifying a base address and size of a first memory block subject to the garbage collection; and
assigning a binary value to each first memory block section, including assigning a binary value corresponding to an enabled section;
obtaining an image of the load instruction and calculating a pointer address from the image; and
determining whether the object pointer is to be modified, wherein:
if the object pointer is not to be modified, storing an unmodified object pointer in a target register determined by the load instruction; and
if the object pointer is to be modified, storing a modified object pointer in the target register.

13. The method of claim 12, wherein the selected portion of memory is part of an object area that includes one or more other objects not undergoing the garbage collection process.

14. The method of claim 13, wherein one or more applications accessing the object area not undergoing the garbage collection process continue to process during the garbage collection process.

15. The method of claim 14, further comprising upon an application accessing the object pointer, using a load monitored doubleword indexed (LDMX) instruction.

16. The method of claim 15, further comprising:
examining the LMDX instruction to determine a source register;
reading the source register; and
calculating the pointer address.

17. The method of claim 12, wherein the base address and size of the first memory block are stored in a register.

* * * * *